US000001948H

(19) United States

(12) Statutory Invention Registration (10) Reg. No.: US H1948 H

Rusek et al. (43) Published: Mar. 6, 2001

(54) HIGH-ACTIVITY CATALYST FOR HYDROGEN PEROXIDE DECOMPOSITION

(75) Inventors: John J. Rusek, North Edwards; Nicole Anderson, Ridgecrest, both of CA (US)

(73) Assignee: The United States of America as represented by the Secretary of the Navy, Washington, DC (US)

(21) Appl. No.: 09/045,127

(22) Filed: Mar. 20, 1998

(51) Int. Cl.[7] ..... B01J 23/02; B01J 23/04; B01J 23/00; B01J 21/08

(52) U.S. Cl. ..... 502/344; 502/241; 502/243; 502/317; 502/324; 502/300; 502/347; 502/325; 502/353; 502/388; 502/305; 423/579

(58) Field of Search ..... 502/241, 243, 502/317, 324; 423/579

(56) References Cited

U.S. PATENT DOCUMENTS

| | | | | |
|---|---|---|---|---|
| 3,019,197 | * | 1/1962 | Saunders | 502/324 |
| 3,333,419 | * | 8/1967 | Baumgartner et al. | 423/579 |
| 3,710,573 | | 1/1973 | Hubbuch et al. | 60/218 |
| 4,292,208 | | 9/1981 | Baldi et al. | 252/470 |
| 4,601,884 | * | 7/1986 | Coeckelberghs et al. | 423/579 |
| 4,629,718 | * | 12/1986 | Jones et al. | 502/324 |
| 4,656,153 | | 4/1987 | Wennerberg | 502/182 |
| 4,927,798 | | 5/1990 | Baldi | 502/301 |
| 5,077,257 | | 12/1991 | Baldi | 502/301 |
| 5,080,882 | * | 1/1992 | Yoshimoto et al. | 423/579 |
| 5,212,139 | * | 5/1993 | Ovalles et al. | 502/324 |
| 5,212,140 | * | 5/1993 | Yoshimoto et al. | 502/324 |
| 5,597,539 | | 1/1997 | Fakley et al. | 423/210 |
| 5,711,146 | | 1/1998 | Armstrong et al. | 60/218 |

* cited by examiner

*Primary Examiner*—Charles T. Jordan
*Assistant Examiner*—Glenda L. Sánchez
(74) *Attorney, Agent, or Firm*—Gregory M. Bokar; David S. Kalmbaugh

(57) ABSTRACT

A high-activity hydrogen peroxide decomposition catalyst comprising an impregnated and calcined substrate with a catalyst mixture. The catalyst mixture comprises a hydrogen peroxide catalytically active compound containing a transition metal cation mixed with an alkaline promoter. A process for forming a high-activity hydrogen peroxide decomposition catalyst and a product of high-activity hydrogen peroxide decomposition are disclosed.

13 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

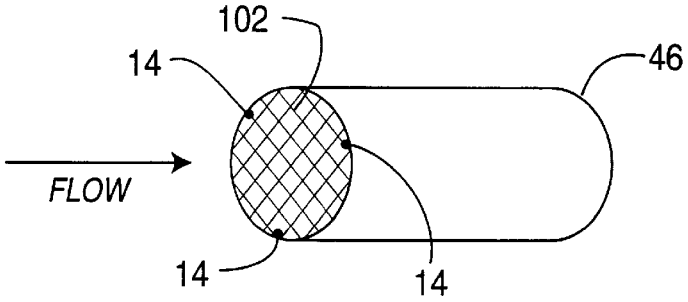
FIG. 1
FIG. 2
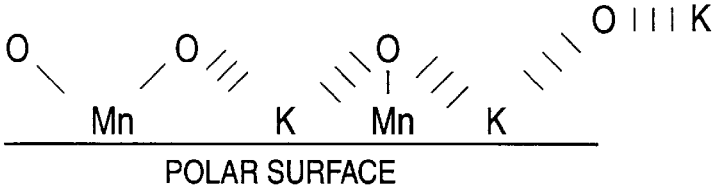
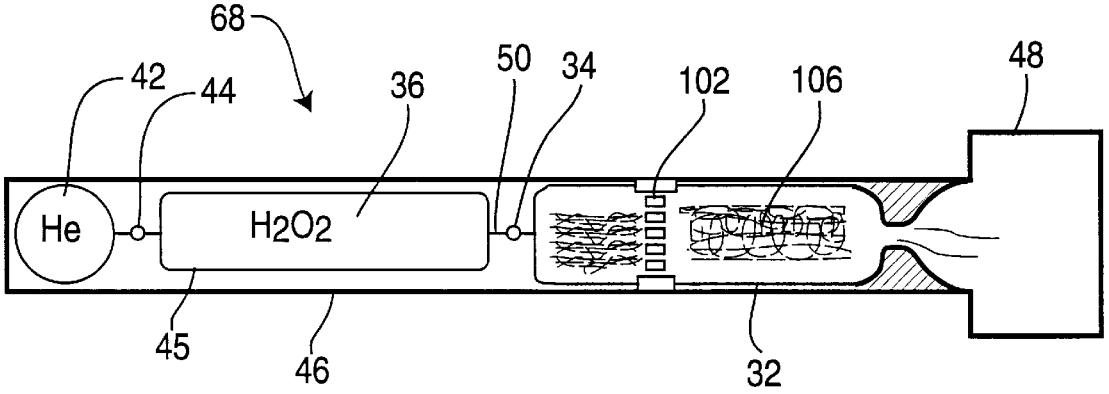
FIG. 3
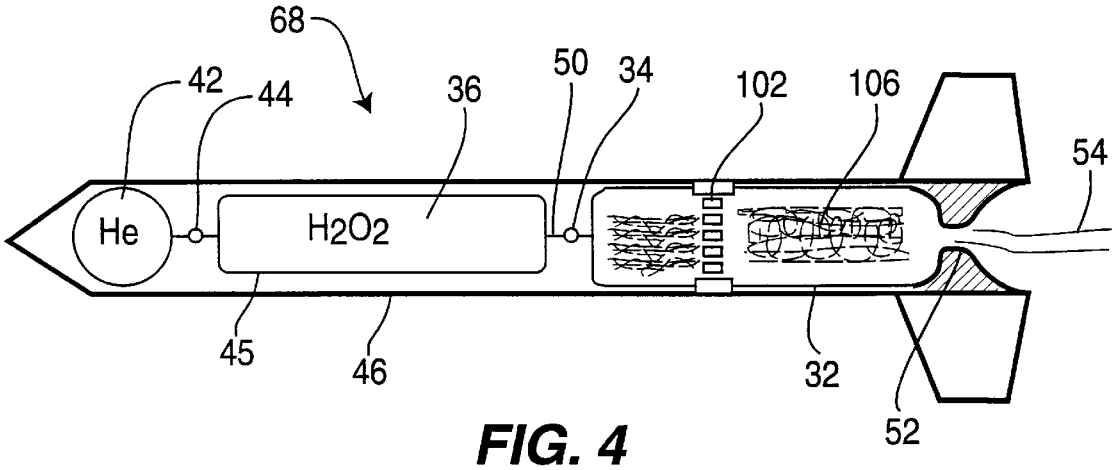
FIG. 4

HIGH-ACTIVITY CATALYST FOR HYDROGEN PEROXIDE DECOMPOSITION

CROSS-REFERENCE TO RELATED APPLICATION

Not applicable.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

MICROFICHE APPENDIX

Not applicable

BACKGROUND OF THE INVENTION

1. Field of the Invention

The present invention relates to high-activity hydrogen peroxide decomposition. More particularly, the present invention uses an activated catalyst for high-activity hydrogen peroxide decomposition. Most particularly, the high-activity hydrogen peroxide decomposition is sufficiently rapid enough to provide thrust within rocket and/or other power systems.

2. Brief Description of the Related Art

Catalysts are used in the decomposition of hydrogen peroxide ($H_2O_2$) for monopropellant thrusters, liquid rocket engines, hybrid rocket systems and the like. Hydrogen peroxide decomposes into water vapor and oxygen. The oxygen product can react with conventional rocket fuel or grains to provide thrust. Within propulsion systems, hydrogen peroxide has been successfully used as an oxidizer for U.S. Navy torpedo systems, U.S.A.F. attitude control thruster"s on the X-15, and for reaction control thrusters on the NASA Scout launch vehicles and Mercury spacecraft.

Catalyst are formed into packs by using layers of nitric acid or samarium salt activated silver plated screens. Within this system, hydrogen peroxide decomposition activity is relatively low. However, increasing the number of screens also increases the activity, but also increases the pressure drop. Contaminants within the hydrogen peroxide may also plate out onto the silver screens. This reduces the active surface area, which in turn reduces the effective decomposition of the hydrogen peroxide. Additionally, the cost of the materials and fabrication are high.

Catalyst pack screens have been disclosed in U.S. Pat. Nos. 5,077,257 (Baldi), 4,927,798 (Baldi), and 4,292,208 (Baldi et al.). However, these patents do not address a low cost hydrogen peroxide catalyst applicable for use as an efficient propulsion system, providing low pressure drop and low weight.

SUMMARY OF THE INVENTION

The present invention provides a high-activity hydrogen peroxide decomposition catalyst comprising an impregnated and calcined substrate with a catalyst mixture, the catalyst mixture comprising a hydrogen peroxide catalytically active compound containing a transition metal cation mixed with an alkaline promoter, wherein the substrate further comprises a porous support material selected from the group consisting of alumina, silica, aluminosilicate, polar ceramics and combinations thereof.

The invention further provides a process for forming a high-activity hydrogen peroxide decomposition catalyst comprising the steps of providing a polar substrate comprising a porous support material selected from the group consisting of alumina, silica, aluminosilicate, polar ceramics and combinations thereof; mixing, in an aqueous solvent, a soluble salt containing a hydrogen peroxide catalytically active compound containing a transition metal cation with an alkaline promoter; applying the mixture over the substrate, wherein the mixture soaks the substrate surface area, thereby impregnating the substrate; drying the applied soaked mixture sufficiently causing the removal of the solvent; and calcining the dried mixture sufficiently to form an activated catalyst.

Additionally, the invention provides a product of high-activity hydrogen peroxide decomposition made by the process of providing a polar substrate comprising a porous support material selected from the group consisting of alumina, silica, aluminosilicate, polar ceramics and combinations thereof; mixing, in a solvent, a soluble salt containing a hydrogen peroxide catalytically active compound containing a transition metal cation with an alkaline promoter; applying the mixture over the substrate, wherein the mixture soaks the substrate surface area, thereby impregnating the substrate; drying the applied soaked mixture sufficiently causing the removal of the solvent; calcining the dried mixture, wherein an activated catalyst is formed; housing the formed activated catalyst into a hydrogen peroxide reaction chamber having a hydrogen peroxide inlet port; and, flowing a compound of hydrogen peroxide through the inlet port wherein the hydrogen peroxide comes in contact with the calcined, impregnated substrate with mixture, wherein the hydrogen peroxide decomposes in a high-activity reaction thereby releasing water, oxygen and energy.

BRIEF DESCRIPTION OF THE DRAWINGS

FIG. 1 is a side cross-sectional view of a singular cellular matrix activated catalyst substrate of the present invention in housing;

FIG. 2 is a side view of the polar substrate surface bonded with manganese and potassium ions with are further bonded to oxygen;

FIG. 3 is a schematic side view of a propulsion system of the present invention using a hydrogen peroxide mono-propellant;

FIG. 4 is a schematic side view of a rocket propulsion system of the present invention using a hydrogen peroxide mono-propellant;

DETAILED DESCRIPTION OF THE PREFERRED EMBODIMENT

Figure 5:
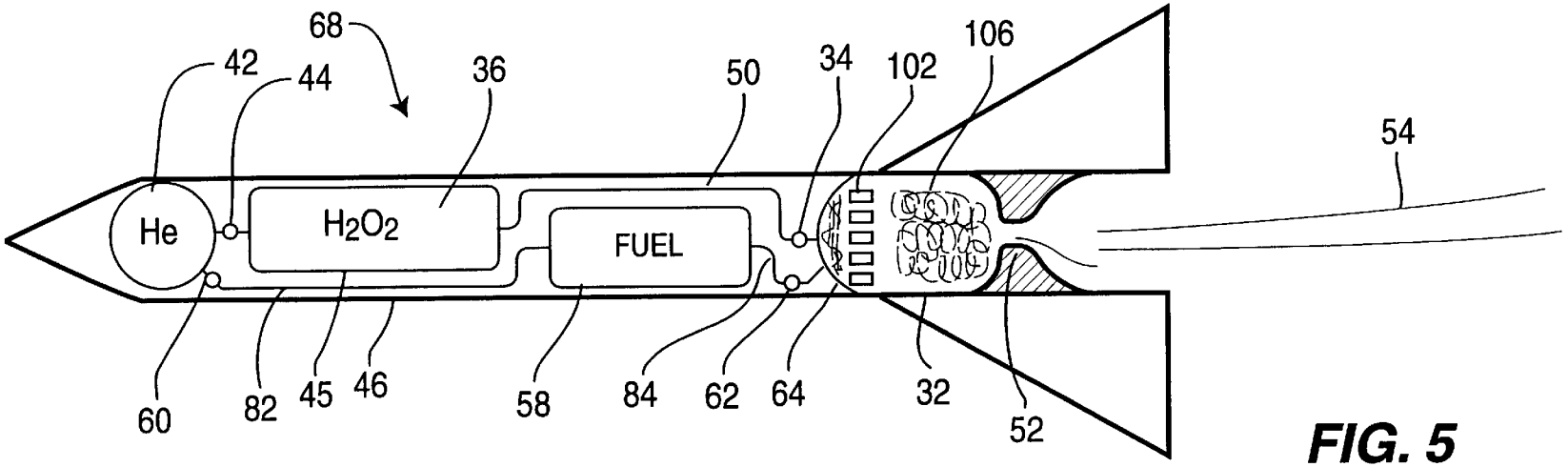
FIG. 5 is a schematic side view of a rocket propulsion system of the present invention using a hydrogen peroxide bi-propellant; and, FIG. 6 is a schematic side view of a rocket propulsion system of the present invention using hydrogen peroxide in a hybrid rocket propulsion system.

The present invention is a hydrogen peroxide decomposition catalyst and process for high activity hydrogen peroxide decomposition, and the product of high-activity hydrogen peroxide decomposition. The present invention comprises a combination catalyst and promoter on a polar substrate to provide sufficiently rapid decomposition of hydrogen peroxide for use as a propellant in rocket thrusters and/or other motor systems. The decomposed hydrogen peroxide provides an environmentally clean product of water vapor and oxygen, which may also be used for additional systems.

Decomposition of hydrogen peroxide provides chemical energy to perform work, such as powering rocket, turbine, electric, other propulsion and auxiliary equipment and the like. The hydrogen peroxide based propellant reduces toxic emissions, increases reliability and efficiency, reduces sound, and obscures carrier signature relative to conventional fuels.

As seen in FIG. 1, the present invention comprises an activated catalyst substrate 102 which may be placed in a rocket or similar housing 46 and held in place by end screens 14 within the housing 46. The activated substrate 102 includes a high-activity hydrogen peroxide decomposition catalyst which has been included therein. The activated substrate 102 comprises a porous support material, such as alumina, silica, aluminosilicate, polar ceramics and combinations thereof. The activated substrates 102 have a porous surface, which maximizes the amount of catalyst impregnated and calcined thereon. Additionally, the activated substrates 102 are polar which allows a catalyst to properly arrange along the surface of the activated substrate 102, thereby providing an activated catalyst. The activated substrates 102 are high temperature and non-oxidizing to withstand the temperature occasioned by the decomposition of the hydrogen peroxide. The temperature of decomposing hydrogen peroxide is proportional to the percentage of hydrogen peroxide available in a given propellant. For example, 100% by mass hydrogen peroxide yields a reaction product with an adiabatic decomposition temperature of 1824° F., 95% by mass hydrogen peroxide yields 1593° F., 90% by mass hydrogen peroxide yields 1364° F., 80% by mass hydrogen peroxide yields 908° F., 50% by mass hydrogen peroxide yields 212° F., and 35% by mass hydrogen peroxide yields 212° F. Any oxidizable activated catalyst substrate 102 becomes inefficient with the decomposition of the hydrogen peroxide, providing limited use.

The activated substrate 102 may comprise a singular structured polar substrate, as shown in FIG. 1, or multiple polar substrates. Preferably, the activated substrate 102 comprises a singular structure. More preferably, the singularly structured activated substrate 102 comprises a matrix. Most preferably, the matrix comprises a cellular matrix. Activated substrates 102 may include, but is not limited to, pellets, spheres, grids, and the like. The activated substrate 102 may be loaded within the housing 46 by placing the activated substrate 102 in line between an $H_2O_2$ pressurized storage tank and an expansion chamber. The storage tank and expansion chamber may be any configuration which promotes the efficiency of the system, such as being cylindrical, the configuration of which is detenninable by those skilled in the art. Typically, the activated substrate 102 is held in place by end capture or metallic end screens 14 or other similar fixed systems, as shown in FIG. 1.

The activated substrate 102 is formed by impregnating and calcining a polar substrate with a catalyst mixture. The catalyst mixture comprises a hydrogen peroxide catalytically active compound containing a transition metal cation mixed with an alkaline promoter. The transition metal may be any of the elements from Groups VB, VIB, VIIB, VIII and IB of the Periodic Table of Elements, specifically listed as vanadium (V), chromium (Cr), manganese (Mn), iron (Fe), cobalt (Co), nickel (Ni), copper (Cu), niobium (Nb), molybdenum (Mo), technetium (Te), ruthenium (Ru), rhodium (Rh), palladium (Pd), silver (Au), tantalum (Ta), wolfram (W), rhenium (Re), osmium (Os), iridium (Ir), platinum (Pt) and gold (Ag). Preferably the catalyst mixture comprises a transition metal cation selected from the group consisting of Mn, Ag, Ru, V, Fe, Cr, Co and mixtures thereof. Examples of valence states of certain transition metal cations used in the present invention include $Mn^{+4}$, $Ru^{+4}$, $V^{+5}$, $CU^{+4}$, $Cr^{+4}$, $Cr^{+3}$, $Co^{+2}$, $Co^{+}$, and the like, within valence-corresponding salts thereof. More preferably, the catalyst mixture comprises a cation selected from the group consisting of tetravalent manganese and tetravalent copper. Most preferably the catalyst mixture comprises tetravalent manganese.

The alkaline promoter may be any compound which provides a basic solution containing elements from Groups IA and IIA of the Periodic Table of Elements. Preferably, the alkaline promoter contains an ion such as lithium ($Li^{+}$), potassium ($K^{+}$), sodium ($Na^{+}$), and ammonium ($NH_4^{+}$). More preferably, the alkaline promoter contains $K^{+}$ ions, $Na^{+}$ ions, and/or combinations thereof. The alkaline promoter provides high stability when used in conjunction with the transition metal and polar substrate.

The promoter and transition metal are mixed in defined molar proportions. Preferably, the promoter and transition metal are mixed at a molar ratio of from about 0.5 to about 4.0, more preferably at a molar ratio of from about 1.0 to about 3.0, and most preferably at a molar ratio of from about 1.0 to about 2.0.

The weight of the polar substrate is measured in relation to the weight of the calcined metals of both the transition metal and promoter of the catalyst mixture. Preferably the polar substrate comprises from about 0.01 weight percent to about 85.0 weight percent of the transition metal and promoter. More preferably, the polar substrate comprises from about 0.5 weight percent to about 10.0 weight percent of the transition metal and promoter. Most preferably, the polar substrate comprises from about 1.0 weight percent to about 20.0 weight percent of the transition metal and promoter. For example, manganese (+4) and potassium may have a 1% weight/weight (w/w) loading on the polar substrate.

The process for forming the high-activity hydrogen peroxide decomposition catalyst comprises the steps of providing a polar substrate comprising a porous support material selected from the group consisting of alumina, silica, aluminosilicate, polar ceramics and combinations thereof; mixing, in a solvent, a soluble salt containing a hydrogen peroxide catalytically active compound containing a transition metal cation with an alkaline promoter; applying the mixture over the polar substrate, wherein the mixture soaks the polar substrate surface area, thereby impregnating the polar substrate; drying the applied soaked mixture sufficiently causing the removal of the solvent; and calcining the dried mixture sufficient to form an activated catalyst.

Soluble salts of the transition metal cation and alkaline promoter are mixed into a solvent to form a catalyst mixture. Examples of such salts include, but are not limited to, $KMnO_4$, $RuCl_3$, $NH_4VO_3$, $(NH_4)_2Cr_2O_7$, and/or $Co(NO_3)_2$. The solvent includes aqueous and non-aqueous solutions which are suited to dissolving the transition metal cation salt and the alkaline promoter, the type of the solution being detenninable by those skilled in the art. Preferably, the solvent comprises water. More preferably, the water solvent is distilled or deionized water.

The solvent solution containing the mixture of transition metal cation and alkaline promoter is applied over the polar substrate. The application may include pouring the solution onto the polar substrate, submerging the polar substrate into the solution, and other like applications of the solution against the polar substrate which is sufficient to wet the polar substrate in bulk. The application of the catalyst mixture lasts for a suitable equilibration time, which allows the catalyst mixture to soak into and around the polar substrate surface area. The equilibration time is determinable by those skilled in the art, and preferably ranges from about 10 minutes to about 60 minutes. After a suitable equilibration time, the catalyst mixture soaked polar substrate is dried in an oven sufficiently to evaporate or remove the solution, which deposits or impregnates the transition metal and promoter from the catalyst mixture on the polar substrate. The deposited catalyst is activated by calcination of the mixture covered polar substrate forming the activated substrate 102. Calcining the mixture occurs by heating the impregnated polar substrate in an open atmosphere. For example, $KMnO_4$ transforms to a mixture of $MnO_2$ and $K_2O$ after calcination. The calcined mixture forms conditional metal oxides of the catalysts doped or impregnated thereon, which cause hydrogen peroxide to more readily decompose by lowering the activation energy ($E_a$) for decomposition. Heating temperatures and times vary with the selection of promoter, transition metal, amount of solvent, type of polar substrate, and the like, with the temperature and heat time being determinable by those skilled in the art. Generally, the impregnated mixture is preferably calcined at from about 150° C. to about 950° C. for a time period of from about 30 minutes to about 24 hours.

FIG. 2 shows the conditional metal oxides formed on the activated substrate 102 that vary from site to site, but maintain proper stoichiometry. Accordingly, oxides of the transition metal and promoter generally form traditional bonds, such as $MnO_2$, $Ag_2O$, $RuO_2$, $V_2O_5$, $CrO_2$, $Co_2O_3$, and the like. However, it is believed that the calcined combination of the polar substrate surface with the transition metal and promoter create a surface area possessing other oxide forms, such as $K_2O$, and similar oxide configurations containing Li, Na, and $NH_4$. Although normally unstable, these elements possess the general oxide structure, which varies from site to site, on the activated substrate 102 in a stable condition. For example, bonds form to create such chemical forms of $MnO_2 \bullet K_2O$, which may be schematically represented as shown in FIG. 2. In FIG. 2, the compounds Mn and K are attached to the polar substrate and further bond to oxygen molecules. The decomposition of hydrogen peroxide along the surface of the metal oxide covered activated substrate 102 does not dissipate or otherwise significantly degrade the activated substrate 102. Significant degradation would exist when hydrogen peroxide decomposition diminishes such that the hydrogen peroxide does not function as a propellant.

The activated substrate 102 of the present invention, containing a highly porous polar substrate impregnated with a calcined transition metal and promoter, facilitates the decomposition of $H_2O_2$ to a degree permitting such use of the $H_2O_2$ as a rocket propellant when $H_2O_2$ is flowed through an activated catalyst chamber containing the activated catalyst substrate 102. A low pressure drop occurs with the highly catalytic contact of the $H_2O_2$ on the activated substrate 102. The decomposition of the $H_2O_2$ occurs according to the following reaction:

$$2H_2O_2 \rightarrow 2H_2O + O_2.$$

Flowing 100 cc of 90 mole % $H_2O_2$ through an activated catalyst chamber causes a violent reaction to occur at temperatures of 1200° F. with stream emissions of water, oxygen and energy.

FIGS. 3, 4, 5 and 6 illustrate a product of high-activity hydrogen peroxide decomposition 106. The high-activity hydrogen peroxide decomposition 106 is made by the process of providing a polar substrate comprising a porous support material selected from the group consisting of alumina, silica, aluminosilicate, polar ceramics and combinations thereof mixing, in a solvent, a soluble salt containing a hydrogen peroxide catalytically active compound containing a transition metal cation with an alkaline promoter, applying the mixture over the polar substrate, wherein the mixture soaks the polar substrate surface area, thereby impregnating the polar substrate, drying the applied soaked mixture sufficiently causing the removal of the solvent, calcining the dried mixture, wherein an activated catalyst, or activated substrate 102 is formed, housing the formed activated catalyst into a hydrogen peroxide reaction chamber 32 having a hydrogen peroxide inlet port or valve 34, and, flowing a compound of hydrogen peroxide 36 through the inlet port 34 wherein the hydrogen peroxide comes in contact with the calcined, impregnated mixture, wherein the hydrogen peroxide 36 decomposes in a high-activity reaction thereby releasing water, oxygen and energy. The hydrogen peroxide 36 propellant may comprise from about 85% by mass or greater hydrogen peroxide, preferably from about 90% by mass hydrogen peroxide or greater, more preferably from about 95% by mass hydrogen peroxide or greater, and most preferably from about 98% by mass hydrogen peroxide or greater. The higher mass percentage of hydrogen peroxide 36 provides the greatest versatility in energy conversion, and the level of hydrogen peroxide 36 would be determinable by those skilled in the art applicable for a particular use.

The present invention may comprise a mono-propellant, bi-propellant or multi-propellant hydrogen peroxide device. Preferably, the present invention comprises a mono-propellant of hydrogen peroxide. More preferably, the hydrogen peroxide monopropellant consists essentially of hydrogen peroxide.

The energy released from the high-activity hydrogen peroxide decomposition 106 is measured as adiabatic decomposition temperature. For example, at one atmosphere, 100% by mass hydrogen peroxide yields a reaction product with an adiabatic decomposition temperature of 1824° F., 95% by mass hydrogen peroxide yields 1593° F., 90% by mass hydrogen peroxide yields 1364° F., 80% by mass hydrogen peroxide yields 908° F., and from about 64.7% or less by mass hydrogen peroxide yields 212° F. The high-activity hydrogen peroxide decomposition 106 may propel any object capable of housing the hydrogen peroxide decomposition, preferably a rocket motor or steam engine.

FIG. 3 illustrates the activated substrate 102 housed within a propulsion system 68, such as a rocket, steam turbine or gas-generator, and other like movable or stationary systems, using hydrogen peroxide 36 as a mono-propellant. The activated substrate 102 is housed or packed into a motor or other decomposition-type chamber 32 to provide energy for movement, such as a steam turbine. A pressurized tank of helium (He) 42 flows helium through an open valve 44 and into a pressurized $H_2O_2$ tank 45. The helium pressurizes against the $H_2O_2$ 36 in the pressurized $H_2O_2$ tank 45, causing the $H_2O_2$ 36 to flow through an open valve 34 in flowline 50, and through the activated substrate 102. The contact of the $H_2O_2$ 36 over the activated substrate 102 causes a rapid decomposition 106 of the $H_2O_2$ 36, forming high temperature steam and oxygen within the expansion chamber 32. The decomposed $H_2O_2$ 36 further flows into a steam turbine 48 and impinge on rotary blades, which propels the stream turbine 48. For steam turbine 48 use, the superheated steam is preferably heated to from about 1000° F. to about 1800° F., more preferably from about 1100° F. to about 1500° F., and most preferably from about 1100° F. to about 1200° F. The temperature range for the superheated steam varies by use, and may be determined by those skilled in the art. Propulsion may be obtained using the decomposed $H_2O_2$ 36 from the activated substrate 102 without combustion of other reactants.

FIG. 4 illustrates the propulsion system 68 shown in FIG. 3 as a rocket mono-propellant of hydrogen peroxide. The pressurized tank of helium (He) 42 flows helium through the open valve 44 and into the pressurized $H_2O_2$ tank 45. The helium pressurizes against the $H_2O_2$ 36 in the pressurized $H_2O_2$ tank 45, causing the $H_2O_2$ 36 to flow through the open valve 34 in flowline 50, and through the activated substrate 102. The contact of the $H_2O_2$ 36 over the activated substrate 102 causes a rapid decomposition 106 of the $H_2O_2$ 36, forming high temperature steam and oxygen within the expansion chamber 32. Propulsion occurs when the high temperature steam and oxygen within the expansion chamber 32 flow out of a rear nozzle 52 into a jet stream 54. Propulsion may be obtained using the decomposed $H_2O_2$ 36 from the activated substrate 102 without combustion of other reactants.

FIG. 5 illustrates the rocket of the propulsion system 68, shown in FIG. 4, as a bi-propellant of hydrogen peroxide used with a compatible second propellant. The pressurized tank of helium (He) 42 flows helium through the open valve 44 and into the pressurized $H_2O_2$ tank 45. The helium pressurizes against the $H_2O_2$ 36 in the pressurized $H_2O_2$ tank 45, causing the $H_2O_2$ 36 to flow through the open valve 34 in flowline 50, and through the activated substrate 102. The contact of the $H_2O_2$ 36 over the activated substrate 102 causes a rapid decomposition 106 of the $H_2O_2$ 36, forming high temperature steam and oxygen within an expansion chamber 32. Propulsion occurs when the high temperature steam and oxygen within the expansion chamber 32 flow out of the rear nozzle 52 into a jet stream 54. Additionally, the helium travels through an open valve 60 in flowline 82 to a rocket liquid fuel tank 58. The helium forces fuel from the rocket liquid fuel tank 58 through an open valve 62 in flowline 84, through fuel injectors 64, and into the expansion chamber 32. The liquid rocket fuel in the expansion chamber 32 unites with the decomposing $H_2O_2$ 36 to form a powerful combustion, which emits a jet stream 54 out of the combustion chamber 32 through rear nozzle 52.

Figure 6:
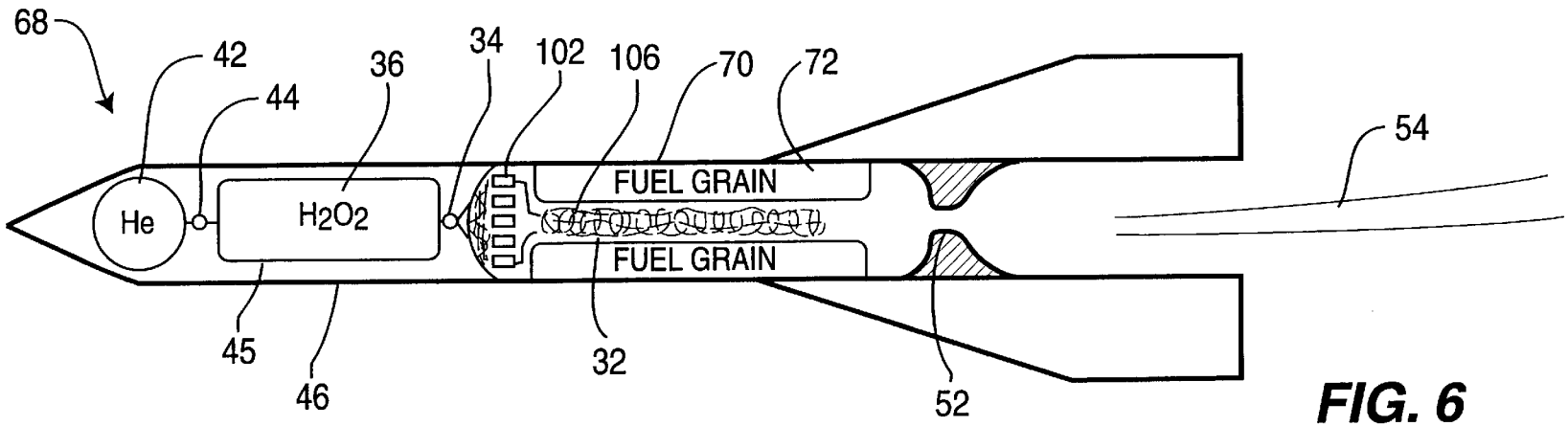

Combustion involving other reactants is shown in FIG. 6. FIG. 6 illustrates the motor of FIG. 3 as a hybrid rocket propulsion system 68. As shown in FIG. 6, the pressurized tank of helium (He) 42 flows helium through the open valve 44 and into the pressurized $H_2O_2$ tank 45. The helium pressurizes against the $H_2O_2$ 36 in the pressurized $H_2O_2$ tank 45, causing the $H_2O_2$ 36 to flow through the open valve 34 in fowline 50, and through the activated substrate 102. The contact of the $H_2O_2$ 36 over the activated substrate 102 causes a rapid decomposition 106 of the $H_2O_2$ 36, forming high temperature steam and oxygen within an expansion chamber 32. The high temperature steam and oxygen flow down the interior of a fuel grain tube 70, combusting with fuel grain 72, thereby consuming and eroding the interior of the fuel grain tube 70. This forms a hybrid jet stream 54 which flows through rear nozzle 52 as a jet stream 54 which propels the rocket. The jet stream 54 of the rocket may be shut off by closing the valve 34 and later restarted by opening the valve 34.

The high-activity decomposition 106 of the $H_2O_2$ 36 results in a significant increase in volume and temperature over a short time period. This permits the present invention to be used in high-flow applications. Preferably the volume increase is from about 10,000 to about 1 increase, more preferably from about 5000 to about 1 increase, and most preferably from about 1000 to about 1 increase. The temperature preferably increases to about 1000° F. or higher, more preferably from about 1100° F. or higher, and most preferably from about 1500° F. to about 1800° F. The time of decomposition preferably is from about 10 seconds or less, more preferably from about 5 seconds or less, and most preferably from about 3 seconds to 1 second.

The present invention provides significantly higher hydrogen peroxide decomposition 106 activity and lower pressure drop. The activated substrate 102 is disposable or recyclable with relatively low costs of fabrication and cleaning, respectively. Furthennore, the present invention maintains a high poisoning threshold or blockage, and low weight. The activated substrate 102 of the present invention is suitable for use with a liquid oxidizer injection system for a bi-propellant rocket, with an oxidizer system in a hybrid rocket motor, as a gas generator, as a starter cartridge, and/or as a hydrogen peroxide mono-propellant thruster. Examples include such systems as those used in attitude control thrusters, and the Mercury and Scout rocket programs, and the like.

EXAMPLE 1

1 molar solution of sodium pennanganate was prepared by dissolving 141.93 grams of $NaMnO_4$ in 1 liter of deionized water. After dissolution, one mole of sodium hydroxide (40.00 grams) was added to the solution and allowed to dissolve to form the impregnation solution. 400, 600, 900, and 1100 pore per $in^2$ monolithic catalyst substrates, comprised of synthetic cordierite, manufactured by Corning Incorporated of Corning N.Y., were sliced to proper thickness of one-half inch and cored to proper diameter of one inch. These substrates were dried overnight at 200° C. The substrates were allowed to soak in the impregnation solution for one hour, were drained, blotted and then dried and calcined at 325° C. overnight. The impregnation and calcination processes were repeated twice to form the finished catalyst which contained the sodium alkaline promoter in an amount to the active manganese in a molar ratio of two to one.

EXAMPLE 2

1 molar solution of cobalt acetate tetrahydrate was made by dissolving 249.08 grams of $Co(C_2H_3O_2)_2 \cdot 4H_2O$ in 1 liter of distilled water. After dissolution, one mole of potassium hydroxide (56.11 grams) was added and dissolved to form the impregnation solution. Cored sections of alumina foam, used as the catalytic substrate, were dried overnight at 200° C. The impregnation solution was poured over the substrates, and the entire mass was allowed to soak for one hour at ambient conditions. The substrates were drained, blotted, and then calcined at 250° C. for two hours. The process was repeated once to form the finished catalyst which contained an equimolar ratio of cobalt and potassium, the alkaline promoter.

EXAMPLE 3

0.25 molar solution of potassium permanganate was made by dissolving 39.51 grams of $KMnO_4$ in 1 liter of demineralized water, forming the impregnation solution. Cylindrical structures of cordierite monoliths of varying pore densities were formed by diamond core drilling, having a nominal diameter of one inch and a nominal length of three inches. After machining, the cylindrical structures were washed and dried overnight at 200° C. The dried billets were soaked in the impregnation solution for two hours, drained, blotted, and then calcined for one hour at 350° C. The impregnation and calcination steps were repeated three times to yield an active catalyst containing an equimolar ratio of manganese and potassium, the alkaline promoter.

The foregoing summary, description, examples and drawings of the invention are not intended to be limiting, but are only exemplary of the inventive features which are defined in the claims.

What is claimed is:

1. A high-activity hydrogen peroxide decomposition catalyst comprising:

an impregnated and calcined substrate with a catalyst mixture, the catalyst mixture comprising a transition metal cation mixed with an alkaline promoter, wherein the substrate comprises a porous support material selected from the group consisting of alumina, silica, aluminosilicate, polar ceramics and combinations thereof.

2. The catalyst of claim 1, wherein the catalyst comprises a cation selected from the group consisting of Mn, Ag, Ru, V, Fe, Cr, Co and mixtures thereof.

3. The catalyst of claim 2, wherein the catalyst comprises a cation selected from the group consisting of tetravalent manganese and tetravalent copper.

4. The catalyst of claim 3, wherein the catalyst comprises tetravalent manganese.

5. The catalyst of claim 1, wherein the alkaline promoter contains an ion selected from the group consisting of $Li^+$, $K^+$, $Na^+$, and $NH_4^+$.

6. The catalyst of claim 5, wherein the alkaline promoter contains an ion selected from the group consisting of $K^+$ and $Na^+$.

7. The catalyst of claim I, wherein the promoter and catalyst are mixed at a molar ratio of from about 0.5 to about 4.0.

8. The catalyst of claim 7, wherein the promoter and catalyst are mixed at a molar ratio of from about 1.0 to about 2.0.

9. The catalyst of claim 1, wherein the substrate comprises from about 0.01 weight percent to about 20.0 weight percent of metals.

10. The catalyst of claim 1, wherein the substrate comprises a singular structure.

11. The catalyst of claim 10, wherein the singular structure comprises a matrix.

12. The catalyst of claim 11, wherein the matrix comprises cellular matrix.

13. A process for forming a high-activity hydrogen peroxide decomposition catalyst comprising the steps of:

providing a polar substrate comprising a porous support material selected from the group consisting of alumina, silica, aluminosilicate, polar ceramics and combinations thereof;

mixing, in a solvent, a soluble salt containing a transition metal cation with an alkaline promoter;

applying the mixture over the substrate, wherein the mixture soaks the substrate surface area, thereby impregnating the substrate;

drying the applied soaked mixture sufficiently causing the removal of the solvent; and, calcining the dried mixture sufficient to form an activated catalyst.

* * * * *